UNITED STATES PATENT OFFICE 2,382,867

PREPARATION OF ACETOPHENONE

William S. Emerson, Van Buren Township, Montgomery County, Ohio, assignor to Monsanto Chemical Company, a corporation of Delaware No Drawing. Application August 28, 1942, Serial No. 456,532

6 Claims. (Cl. 260—592)

This invention relates to a process for the preparation of acetophenone from alpha-chlorostyrene.

In the preparation of acetophenone the methods followed heretofore have been based particularly upon the Friedel-Crafts reaction, involving the condensation of benzene with acetyl chloride, acetic anhydride, various acetates or ketene in the presence of metal halide catalysts, especially aluminum chloride. Such methods have been characterized by high catalyst costs, the employment of molecular equivalents of, for example, aluminum chloride, being essential in the Friedel-Crafts synthesis of ketones and the recovery of such catalysts in the desirably anhydrous state being impracticable. Acetophenone has likewise been prepared by a variety of other methods, but the prior processes have been of little industrial interest in that they have been characterized not only by high costs but also by uncertain yields and attended with various other difficulties. For example, it was long ago known to heat alpha-chlorostyrene with concentrated hydrochloric acid to yield acetophenone, together with some triphenyl benzene and other by-products (A. Behal. Bull. soc. chim. (2), 50, 637 (1888)). In a further experiment recorded in the literature a good yield of acetophenone was obtained by boiling for three hours a mixture of chlorostyrene with more than 3 times its amount by weight of concentrated hydrochloric acid (E. Urion and L. Namias. Bull. soc. chim. (5), 3, 2336 (1936)). This method is costly because under the reaction conditions it is impossible to prevent volatilization and consequent dissipation of the concentrated hydrochloric acid. Moreover, the diffusion of the volatilized hydrogen chloride throughout the reaction equipment causes considerable corrosion; so that the principles here involved never led to any practical application.

I have attempted to conduct the conversion of alpha-chlorostyrene into acetophenone by employing dilute hydrochloric acid instead of the concentrated acid in order to eliminate corrosion problems and loss of hydrochloric acid. However, as will hereinafter be disclosed, the use of the dilute acid results in very low conversions.

The present invention is based upon the discovery that dilute hydrochloric acid, e. g., acid of such concentration that the HCl vapor pressure thereof is substantially below 760 mm. (1 atm.) at the reaction temperature, in admixture with a metal chloride, is in some cases as reactive as concentrated hydrochloric acid in the formation of acetophone from alpha-chlorostyrene and in other cases is more reactive.

My improved process for the preparation of acetophenone comprises the heating of alpha-chlorostyrene with from 1 to 6 molar equivalents of hydrogen chloride contained in a sufficient quantity of water to yield a hydrochloric acid of from 10% to 22% concentration, together with from 0.80 to 1.50 molar equivalents of the metal chloride, based on the alpha-chlorostyrene employed. As the metal chloride, I may employ any metal whose chloride is soluble in dilute hydrochloric acid, of the concentration range herein employed, and which is capable of forming chloride ions therein. I may, for example, advantageously employ the chlorides of sodium, potassium, lithium, copper, either cuprous or cupric, aluminum, zinc, calcium, iron, etc.

The effect of the added metal chloride is apparently to supply a combination of ions, metal and chloride, both of which have an accelerating effect upon the hydrolysis of the alpha-chlorostyrene.

The preparation of acetophenone from alpha-chlorostyrene by the present process affords a smooth, economical and easily executed method for the preparation of this valuable ketone. Reaction is effected either at slightly elevated or even at refluxing temperatures, the time of heating generally being of the order of from two to ten hours, depending somewhat upon the concentration of the acid and metal chloride catalyst, nature of the metal salt catalyst, reaction quantities, rate of stirring, etc. The ketone is readily recovered from the reaction mixture by solvent extraction, steam distillation, etc. Due to the low vapor pressure, very little, if any, of hydrogen chloride is lost during the reaction; therefore, the acid-salt mixture may be employed for repeated runs or in a continuous process. However, as the reaction proceeds through liberation of hydrogen chloride, the concentration of the acid in the reaction mixture is constantly being increased. Consequently the original concentration of hydrogen chloride is chosen below that of substantial saturation, so that when the reaction takes place the hydrogen chloride concentration at normal saturation is not exceeded. In a continuous process it is, therefore, advisable to add water to the reaction mixture from time to time in order to maintain the acid concentration at a substantially constant point. The present process thus provides a method for the recovery of reaction hydrogen chloride as an aqueous solution, which feature is highly advantageous from a commercial standpoint.

Example 1

This example illustrates the use of sodium chloride as the salt catalyst in the conversion of alpha-chlorostyrene to acetophenone in the presence of dilute hydrochloric acid. Into a flask equipped with a mechanical stirrer and reflux condenser I placed a mixture consisting of 83 g. of water, 53 cc. of concentrated hydrochloric acid and 14 g. of sodium chloride and then added 28 g. of alpha-chlorostyrene and 0.5 g. of a wetting agent known to the trade as "Santomerse". I then refluxed the whole, with stirring, for a period of 7 hours. The reaction mixture was cooled, extracted with benzene and the benzene extract distilled under partial vacuum. In this manner I obtained 18 g. (74% theoretical yield) of acetophenone. The quantity and quality of the hydrochloric acid is substantially unimpaired and the same may be employed for another run.

In the example above described, I employed an approximately 16% aqueous solution of hydrogen chloride and approximately a 16% aqueous solution of sodium chloride, both figures based upon the contained water. The value of the sodium chloride in the reaction, was determined by heating at a temperature of 100° C. for a time of 7 hours, a mixture of alpha-chlorostyrene and a 16% aqueous solution of hydrochloric acid, employing substantially the same reactant quantities and operating conditions as described above, but omitting the sodium chloride. In the absence of sodium chloride, I recovered a mixture of alpha-chlorostyrene and acetophenone, corresponding only to approximately a 30% yield of acetophenone.

Example 2

I proceeded as in Example 1, except that instead of using 14 g. of sodium chloride, I used 33 g. of zinc chloride. I obtained 18 g. (74% theoretical yield) of acetophenone, which yield corresponds to that obtained when sodium chloride was employed.

Example 3

A mixture consisting of 2 g. of copper powder, 50 g. of cuprous chloride, 190 g. (160 cc.) of concentrated hydrochloric acid and 248 g. of water was boiled for 15 minutes. To the resulting product was gradually added 78 g. of alpha-chlorostyrene and 0.5 g. of a wetting agent known to the trade as "Santomerse." The mixture was refluxed for a period of 7 hours, while stirring vigorously and adding copper powder from time to time as needed in order to maintain continued reaction. The product was steam-distilled until the distillate was no longer cloudy, employing a small amount of tributyl phosphate in the Claisen distilling flask in order to reduce foaming. Upon extraction of the distillate with benzene and subsequent distillation of the benzene extract, 53 g. (78% theoretical yield) of acetophenone was obtained. Although cuprous chloride is employed above, cupric chloride is also effective.

In the above examples there is employed a 16% by weight aqueous solution of hydrogen chloride, this concentration of the acid being used as one which remains substantially unvolatilized during the reaction conditions. However, I may use higher or lower acid concentrations, the maximum concentration being preferably below 25% and the minimum concentration above, say, 5%. Although even higher concentrations may be employed, say, of the order of 28%, which concentration of hydrochloric acid has a partial pressure somewhat below 760 mm. at 100° C. and may therefore be considered as satisfactory from the standpoint of volatility, I have found that such higher concentrations are inadvisable not only from the standpoint of corrosiveness but also from the standpoint of constantly diminishing absorption of the liberated hydrogen chloride. I have found the preferred range of hydrochloric acid concentration to be between 10% and 22%, the lower limit being advantageously employed as the initial concentration in a continuous process and then exceeded as the liberated hydrogen chloride accumulates in the reaction mixture to a maximum of, say, 25%. As the hydrogen chloride tends to accumulate in the reaction solution, water may be added in order to keep the concentration within the preferred range.

Although the above examples illustrate the use of certain specific metal chloride catalysts, other water-soluble ionizable salts may be employed. In the above examples there was employed a 16% aqueous solution of the alkali metal or metal halide, a corresponding concentration of hydrogen chloride being used. However, I may employ greater or lesser amounts of the salt, within the range of from 5% upwardly to saturation, greater amounts of the chloride being advantageous.

What I claim is:

1. A process which comprises reacting alpha-chloro-styrene with water in the presence of aqueous hydrogen chloride of concentration greater than 5% and less than 28% by weight calculated upon HCl and water only, and a metal chloride dissolved therein.

2. A process which comprises reacting alpha-chloro-styrene with water in the presence of aqueous hydrogen chloride of concentration greater than 10% and less than 22% by weight calculated upon HCl and water only, and a metal chloride dissolved therein.

3. A process which comprises reacting alpha-chloro-styrene with water in the presence of aqueous hydrogen chloride of concentration greater than 5% and less than 28% by weight calculated upon the HCl and water only and containing from 5% upwardly to substantial saturation of a metal chloride.

4. A process which comprises reacting alpha-chloro-styrene with water in the presence of dilute hydrochloric acid containing dissolved calcium chloride.

5. A process which comprises reacting alpha-chloro-styrene with water in the presence of dilute hydrochloric acid containing dissolved sodium chloride.

6. A process which comprises reacting alpha-chloro-styrene with water in the presence of dilute hydrochloric acid containing dissolved potassium chloride.

WILLIAM S. EMERSON.